United States Patent [19]

Tanaka et al.

[11] Patent Number: 4,640,526
[45] Date of Patent: Feb. 3, 1987

[54] VEHICLE SUSPENSION APPARATUS

[75] Inventors: Tadao Tanaka, Okazaki; Sunao Chikamori, Nagoya; Mitsuhiko Harara, Okazaki; Yasutaka Taniguchi; Masanaga Suzumura, both of Nagoya; Minoru Tatemoto, Okazaki; Naotake Kumagai, Aichi; Hiroki Abe; Shozo Takizawa, both of Okazaki, all of Japan

[73] Assignee: Mitsubishi Jidosha Kogyo Kabushiki Kaisha, Tokyo, Japan

[21] Appl. No.: 727,373

[22] Filed: Apr. 25, 1985

[30] Foreign Application Priority Data

Apr. 25, 1984 [JP] Japan ............................. 59-60918[U]
Apr. 25, 1984 [JP] Japan ............................. 59-60919[U]
Apr. 25, 1984 [JP] Japan ............................. 59-60921[U]
Mar. 29, 1985 [JP] Japan .................................. 60-66099

[51] Int. Cl.$^4$ ........................................... B60G 11/26
[52] U.S. Cl. .................... 280/707; 280/6 H; 280/DIG. 1
[58] Field of Search ................. 280/707, DIG. 1, 6 R, 280/6 H, 708, 714

[56] References Cited

U.S. PATENT DOCUMENTS 4,164,664  8/1979  Kasiewicz ................... 280/DIG. 1
4,349,077  9/1982  Sekiguchi et al. ................. 280/707
4,401,310  8/1983  Ishikawa et al. ............. 280/DIG. 1

FOREIGN PATENT DOCUMENTS 57-33010  2/1982  Japan.

Primary Examiner—John J. Love
Assistant Examiner—Kenneth R. Rice
Attorney, Agent, or Firm—Frishauf, Holtz, Goodman & Woodward

[57] ABSTRACT

A vehicle suspension apparatus including suspension units each provided for each wheel and having an air spring chamber is disclosed, in which rolling control and vehicle height control are done through control of air to and from the air spring chambers. The driving of a reservoir tank for storing compressed air to be supplied to the air spring chambers, is inhibited until the engine operation has been stabilized after the start of the engine preset level. In this way, the problems in the engine lubrication and idling are solved, and the defficiencies of the starting property of the engine are overcome.

15 Claims, 12 Drawing Figures

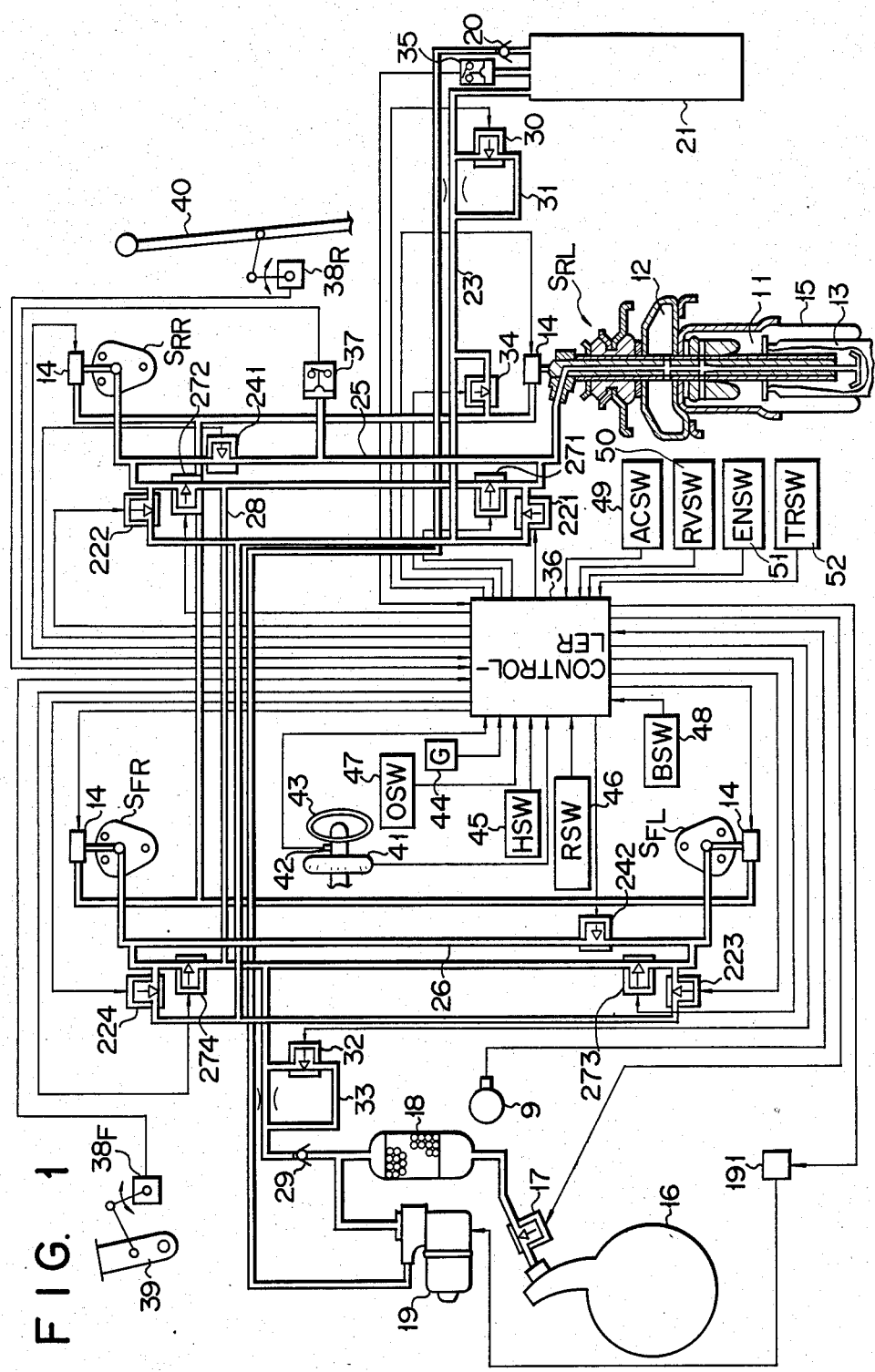
F I G. 1

VEHICLE SUSPENSION APPARATUS

BACKGROUND OF THE INVENTION

This invention relates to a vehicle suspension apparatus with a rolling control function of suppressing the rolling of the vehicle when the vehicle is making a turn or a vehicle height control function of controlling the vehicle height to a desired height.

A well-known vehicle suspension apparatus with the rolling control function or vehicle height control function as noted above, comprises suspension units each provided for each wheel and having an air spring chamber, compressed air supply means for supplying compressed air to the air spring chambers of the individual suspension units through an air supply control valve, and exhausting means for exhausting compressed air from the air spring chambers of the suspension units through an exhaust control valve. The compressed air is supplied from a compressor or a reservoir tank where compressed air produced by the compressor is stored.

In such a suspension apparatus, however, the compressor, which constitutes a comparatively high load, is driven even at the time of or immediately after the start of the engine so long as the pressure in the air spring chambers or in the reservoir tank is lower than a predetermined level. Therefore, a considerable time is passed until the pressure of the engine oil of the engine which drives the compressor exceeds a predetermined level. This is undesired from the standpoint of the engine lubrication. In addition, the idling of the engine cannot be stabilized. Further, when the compressor which consumes comparatively high electric energy is driven concurrently with the starter motor for starting the engine, it is liable that the revolving rate of the starter motor is not increased sufficiently so that a smooth engine start cannot be obtained particularly when it is cold.

SUMMARY OF THE INVENTION

An object of the invention is to provide a vehicle suspension apparatus, in which the driving of the compressor is inhibited until it is detected that the engine operation has been stabilized after the start of the engine, thus solving the problems in the lubrication and idling of the engine and overcoming the defficiencies of the starting property of the engine.

According to the invention, there is provided a vehicle suspension apparatus, which comprises suspension units each provided for each wheel having an air spring chamber, a reservoir tank for storing compressed air to be supplied through an air supply valve to the air spring chambers of the suspension units, exhausting means for exhausting compressed air from the air spring chambers of the suspension units through an exhaust control valve, a compressor driven by a vehicle running engine for supplying compressed air to the reservoir tank, engine control means for detecting the condition of the engine after an engine switch for starting the engine has been turned on, and control means for inhibiting the driving of the compressor until the engine condition detecting means detects that the engine operation has been stabilized after the start of the engine.

BRIEF DESCRIPTION OF THE DRAWINGS

FIG. 1 is a schematic representation of a vehicle suspension apparatus according to the invention;

DETAILED DESCRIPTION OF THE PREFERRED EMBODIMENT

Figure 2:
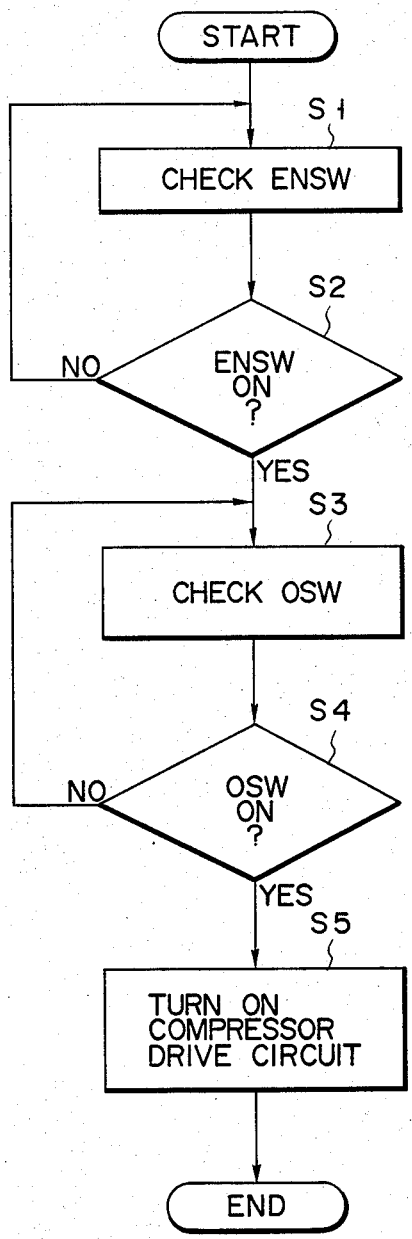
FIG. 2 is a flow chart showing a first example of control in the apparatus.

Now, an embodiment of the invention will be described in detail with reference to the drawings.

FIG. 1 shows an embodiment of the vehicle suspension apparatus according to the invention. The apparatus comprises a right front wheel suspension unit $S_{FR}$, a left front wheel suspension unit $S_{FL}$, a right rear wheel suspension unit $S_{RR}$ and a left rear wheel suspension unit $S_{RL}$. These suspension units $S_{FR}$, $S_{FL}$, $S_{RR}$ and $S_{RL}$ have an identical construction, so only the suspension unit $S_{RL}$ will be described in detail. The suspension unit $S_{RL}$ includes a main air spring chamber 11, an auxiliary air spring chamber 12, a shock absorber 13 and a coil spring (not shown) used as an auxiliary spring. The shock absorber 13 provides an attenuating force, which is switched between hard and soft by a pneumatic switch unit 14. The unit further includes a bellows 15 which defines the main air spring chamber 11. The switching of the air spring between hard and soft is effected by the switch unit 14 through control of bringing about and blocking communication between the main and auxiliary air spring chambers 11 and 12. The switch units 14 are all controlled by a controller 36 including a microcomputer.

Reference numeral 16 designates an air cleaner, and 17 a solenoid valve for blocking external air. Air from the air cleaner 16 is supplied through the solenoid valve 17 to a drier 18. Dry air from the drier 18 is supplied to a compressor 19, and compressed air therefrom is supplied through a check valve 20 to and stored in a reservoir tank 21. The compressor 19 is furnished with drive power from a generator which is driven from an engine (not shown). A relay 191 for the compressor 19 is controlled by the controller 36.

The reservoir tank 21 is connected to the main and auxiliary air spring chambers 11 and 12 of the individual suspension units $S_{FR}$, $S_{FL}$, $S_{RR}$ and $S_{RL}$ via an air supply duct line 23, on which respective air supply solenoid valves 221 to 224 are mounted. The main and auxiliary air spring chambers 11 and 12 of the suspension units $S_{RL}$ and $S_{RR}$ are communicated with one another via a communicating line 25, on which a communicating solenoid valve 241 is mounted. The main and auxiliary air spring chambers 11 and 12 of the suspension units $S_{FL}$ and $S_{FR}$ are communicated with one another via a communicating line 26, on which a communicating solenoid valve 242 is mounted. Compressed air in the main and auxiliary air spring chambers 11 and 12 of the individual suspension units $S_{FR}$, $S_{FL}$, $S_{RR}$ and $S_{RL}$ is discharged through an exhaust duct line 28, on which respective discharge solenoid valves 271 to 274 are mounted, check valve 29, drier 18, solenoid valve 17 and air cleaner 16.

A line 31 is provided in parallel with the air supply line 23, and an air supply flow path selection solenoid valve 30 is mounted on the line 31. A line 33 is provided in parallel with the exhaust line 28, and an exhaust flow path selection solenoid valve 32 is mounted on the line 33. A hard/soft switching solenoid valve 34 is provided between the air supply line 23 and switch unit 14, and it is on-off controlled by a signal from the controller 36.

The solenoid valves 17, 221 to 224, 271 to 274, 30 and 34 are normally closed valves, and solenoid valves 241 and 242 are normally open valves.

A pressure sensor 35 detects the pressure in the reservoir tank 21, and a detection signal from the pressure sensor 35 is fed to the controller 36. A pressure sensor 37 senses the pressure in the main and auxiliary chambers of the rear wheel suspension units $S_{RL}$ and $S_{RR}$, and a detection signal from the pressure sensor 37 is fed to the controller 36.

A vehicle height sensor 38F, which is mounted between a front right lower arm of the suspension and a vehicle body of the vehicle, senses the height of a front portion of the vehicle. A vehicle height sensor 38R, which is mounted between a rear left lateral rod 40 of the suspension and vehicle body of the vehicle, senses the height of a rear portion of the vehicle. Vehicle height detection signals from the vehicle height sensors 38F and 38R are fed to the controller 36. The vehicle height sensors 38F and 38R each consist of a hole IC element and a magnet, one of these being mounted on the wheel side and the other being mounted on the vehicle body side, and detect a distance from a normal height level, a high height level or a low height level of the vehicle. A vehicle speed sensor 41 senses the vehicle speed, and a steering angle sensor 42 senses the steering angle of a steering wheel 43. Detection signals from these sensors 41 and 42 are fed to the controller 36. An acceleration sensor 44 senses acceleration exerted to the vehicle body in the forward and rearward directions, leftward and rightward directions and upward and downward directions. This sensor may use a weight and a light-blocking member interlocked thereto. In the absence of any exerted acceleration, the weight is in its normal, downwardly directed state, and the interlocked light-blocking member is blocking light from a light-emitting diode so that no light is incident on a photodiode. Absence of acceleration is thus detected. When the weight is inclined or moved, it is detected that an acceleration is exerted to the vehicle body.

A vehicle height selection switch (HSW) 45 can select a high vehicle height (HIGH), a low vehicle height (LOW) and an automatic vehicle height control mode (AUTO). A rolling control selection switch (RSW) 46 can select a control mode for reducing rolling of the vehicle. Signals of these switches 45 and 46 are fed to the controller 36. An oil pressure sensor (OSW) 47 senses the pressure P of engine lubrication oil. A brake sensor (BSW) 48 senses the extent of brake pedal depression. An acceleration aperture sensor 49 senses the engine acceleration aperture. An engine revolving rate sensor (RVSW) 50 senses the revolving rate N of the engine. An engine switch (ENSW) 51 is an ignition switch or the like for starting the engine. A transmission stage sensor (TRSW) 52 senses a speed change stage of the transmission. Output signals of the switches 45, 46 and 51 and sensors 47 to 50 and 52 are fed to the controller 36.

The controller 36 controls the vehicle height by comparing the vehicle height detected by the vehicle height sensors 38F and 38R to a desired vehicle height set by the vehicle height selection switch 45 and controlling the individual control valves such as to let the vehicle height coincide with the desired vehicle height.

The controller 36 further has a vehicle position or rolling control function of controlling the individual solenoid valves such as to cancel changes in the vehicle attitude, the vehicle position change and direction thereof being sensed by respective sensors.

When the vehicle height control noted above is done, the vehicle height is changed slowly by closing the air supply flow path selection solenoid valve 30 and exhaust flow path selection solenoid valve 32, thereby reducing the passenger's uncomfortability at the time of the vehicle height control. When the rolling control note above is done, the air supply flow path selection solenoid valve 30 and exhaust flow path selection solenoid valve 32 are opened, whereby it is possible to sufficiently cope with even a sudden position change.

Now, the control of driving of the compressor 19 for supplying compressed air to the reservoir tank 21 will be described in conjunction with a first example with reference to FIG. 2.

In the first example, a pressure switch which provides a signal when and only when the oil pressure exceeds a predetermined level is used as the oil pressure sensor 47. The preset level substantially corresponds to an oil pressure that is obtained when the idling is stabilized after the start of the engine.

First, a check is done in a step S1 as to the position of the engine switch ENSW. Then, a check is done in a step S2 as to whether the engine switch is "on". When the decision of the check in the step S2 is "YES", the routine proceeds to a step S3. If the decision in the check is "NO", the routine goes back to the step S1. In the step S3, the state of the oil pressure sensor (OSW) 47 is checked. Then a step S4 is executed, in which a check is done as to whether the oil pressure sensor 47 has turned on, i.e., whether the engine oil pressure has exceeded a predetermined level. When the decision of the check in the step S4 is "YES", a step S5 is executed, in which a compressor drive circuit is turned on to be ready for driving the compressor 19 to supply compressed air to the reservoir tank 21. If the decision of the check in the step S4 is "NO", the routine goes back to the step S3 of checking the state of the oil pressure sensor 47.

It is to be understood that after the engine switch has turned on, the driving of the compressor 19, which constitutes a high load, is inhibited until the engine oil pressure exceeds the preset level after the start of the engine.

As has been shown in the example of FIG. 2 the driving of the compressor 19 is reliably inhibited while the engine lubrication oil pressure is lower than the preset level, and it becomes possible to drive the compressor 19 when and only when the engine operation is stabilized with increase of the engine lubrication oil pressure to a sufficient level. Thus, it is possible to solve the problems in the engine lubrication and idling and overcome the difficiencies of the starting property due to a load that is applied to the engine when the compressor 19 is driven.

Figure 3:
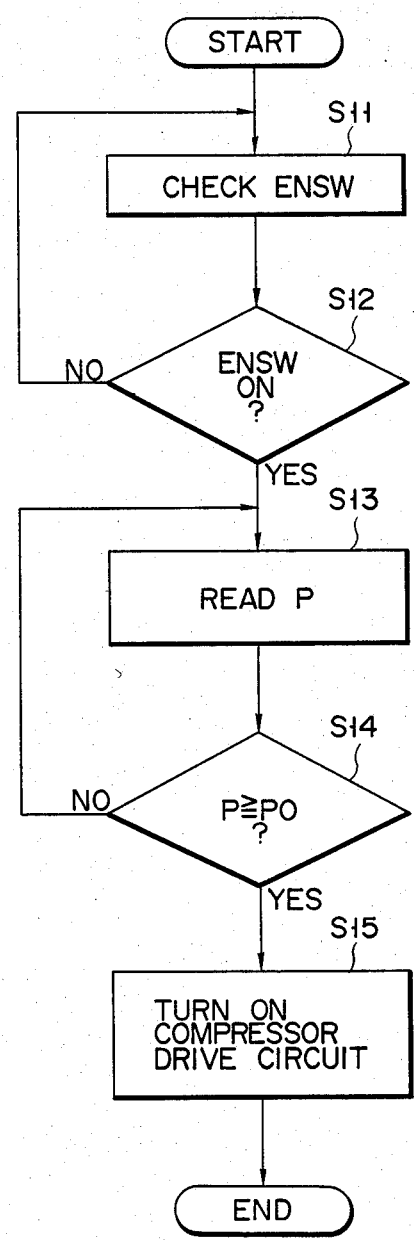
FIG. 3 is a flow chart showing a second example of control.

Now, the control will be described in connection with a second example with reference to FIG. 3. The flow chart of FIG. 3 illustrates a routine of the controller 36 in this example.

First, the position of the engine switch ENSW is checked in a step S11. Then, a check is done in a step S12 as to whether the engine ignition switch is "on". If the decision of the check in the step S12 is "YES", a step S13 is executed. If the decision is "NO", the routine goes back to the step S11 of checking the engine switch position. In the step S13, the controller 36 reads out the engine oil pressure data P provided from the oil pressure sensor 47. In a subsequent step S14, a check is done in the controller 36 as to whether the engine oil pressure P has exceeded a preset level Po kg/cm$^2$. Like the first example described above, the preset level corresponds substantially to the oil pressure that is obtained when the idling of the engine is stabilized after the start thereof.

If the decision of the check in the step S14 is "YES", a step S15 is executed, in which the compressor drive circuit is turned on to permit driving of the compressor 19 to supply compressed air to the reservoir tank 21. If the decision of the check in the step S14 is "NO", the routine goes back to the step S13 of checking the position of the engine switch.

It is to be noted that after the engine switch has been turned on, the driving of the compressor 19 constituting a high load is inhibited until the engine lubrication oil pressure exceeds the preset level (Po kg/cm$^2$) after the engine start.

Thus, with the second example the same effects as of the preceding first example can be obtained.

Figure 4:
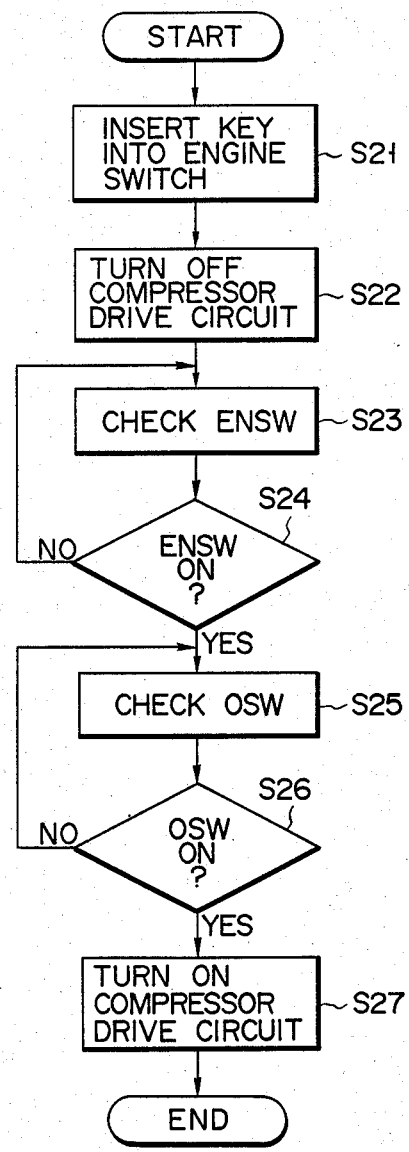
FIG. 4 is a flow chart showing a third example of control.

Now, a third example of control will be described with reference to FIG. 4. In this example, a pressure switch is adopted as the oil pressure sensor 47 like the first example. The flow chart of FIG. 4 illustrates a routine in this example.

First, it is detected in a step S21 that a key is inserted into the engine switch by the driver. The routine then proceeds to a step S22, in which the compressor drive circuit is turned off through control by the controller 36. In consequence, the driving of the compressor 19 is inhibited. In a subsequent step S23, the engine switch position is checked. In a subsequent step S24, a check is done as to whether the engine switch is "on". If the decision of the check in the step S24 is "YES", a step S25 is executed. If the decision is "NO", the routine goes back to the step S23 of checking the engine switch position. In the step S25, the state of the oil pressure sensor (OSW) 47 is checked. Then a step S26 is executed, in which a check is done as to whether the oil pressure sensor 47 has been turned on with increase of the engine oil pressure beyond a preset level. If the decision of the check in the step S26 is "YES", a step S27 is executed, in which the compressor drive circuit is turned on to permit driving of the compressor 19 for supplying compressed air to the reservoir tank 21. If the decision of the check in the step S26 is "NO", the routine goes back to the step S25 of checking the engine switch position.

It is to be understood that the compressor drive circuit is turned off when the key is inserted into the engine switch, and the driving of the compressor 19 constituting a high load is inhibited until the engine oil pressure has exceeded the preset level after the engine start.

Thus with the third example the same effects as of the preceding examples can be obtained.

Figure 5:
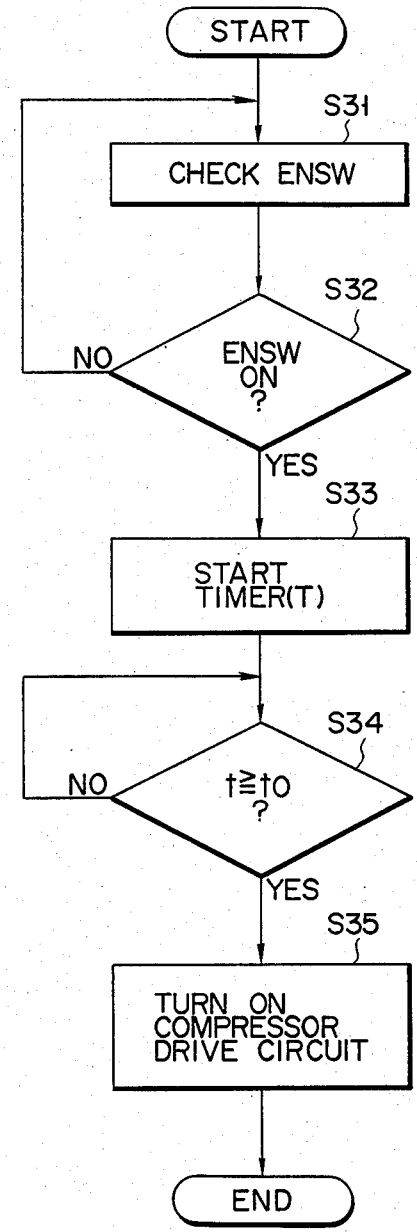
FIG. 5 is a flow chart showing a fourth example of control.

Now, a fourth example will be described with reference to FIG. 5. The flow chart of FIG. 5 illustrates a routine of the controller 36 in this example.

First, an engine switch position check is done in a step S31. In a subsequent step S32, a check is done as to whether the engine switch is "on". If the decision of the check in the step S32 is "YES", a step S33 is executed. If the decision is "NO", the routine goes back to the step S31 of checking the engine switch position. In the step S33, a timer T of $t_0$ sec, provided in the controller 36, is started. In a subsequent step S34, a check is done as to whether the preset time of $t_0$ sec counted to by the timer has passed. The preset time of $t_0$ sec corresponds to a sufficient period of time for the stabilization of the engine idling after the closure of the engine switch and start of engine.

If the decision of the check in the step S34 is "YES", a step S35 is executed, in which the compressor drive circuit is turned on to permit driving of the compressor 19 for supplying compressed air to the reservoir tank 21.

It is to be noted that after the engine switch has been turned on, the driving of the compressor constituting a high load can be inhibited until a preset time has passed, which is necessary for the stabilization of the engine idling, after the start of the engine.

It is thus possible to solve the problems arising in the engine lubrication and idling and overcome the defficiencies in the engine starting property when the compressor 19 is driven.

Figure 6:
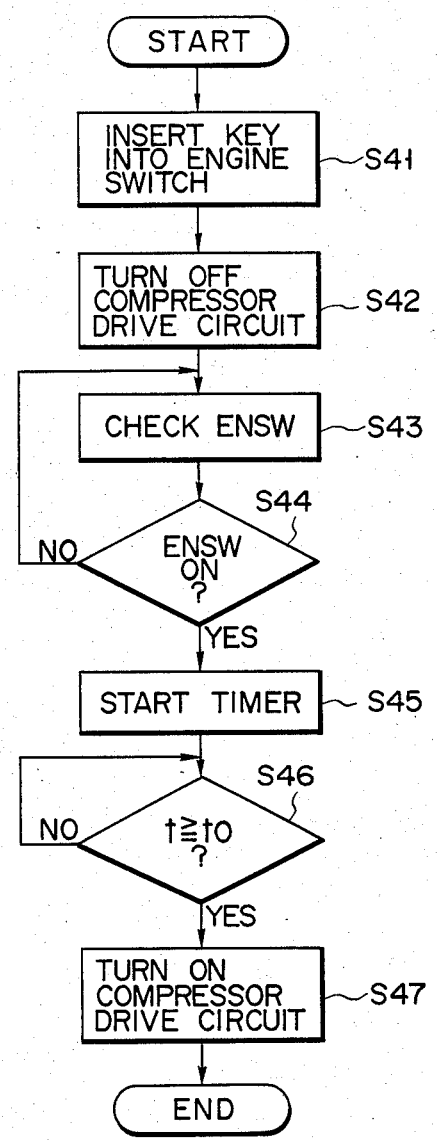
FIG. 6 is a flow chart showing a fifth example of control.

Now, a fifth example will be described with reference to FIG. 6. The flow chart of FIG. 6 illustrates a routine in this example.

First, it is detected in a step S41 that a key is inserted into the engine switch by the driver. The routine then proceeds to a step S42, in which the compressor drive circuit is turned off through control by the controller 36. In consequence, the driving of the compressor 19 is inhibited. In a subsequent step S43, the engine switch position is checked. In a subsequent step S44, a check is done as to whether the engine switch is "on". If the decision of the check in the step S44 is "YES", a step S45 is executed. If the decision is "NO", the routine goes back to the step S43 of checking the engine switch position. In the step S45, a timer with a timer period of $t_0$ sec in the controller 36 is started. In a subsequent step S46, a check is done as to whether the preset time of $t_0$ sec. counted by the timer has passed. The preset time is set in the same way as in the preceding fourth example. If the decision of the check in the step S46 is "YES", a step S47 is executed, in which the compressor drive circuit is turned on to permit driving of the compressor 19 for supplying compressed air to the resrevoir tank 21.

It is to be noted that the compressor drive circuit is turned off when the key is inserted into the engine switch, and the driving of the compressor 19 constituting a high load is inhibited until the the preset time of $t_0$ sec necessary for the stabilization of the engine idling has passed after the engine start. Thus with the fifth example the same effects as of the preceding examples can be obtained.

Figure 7:
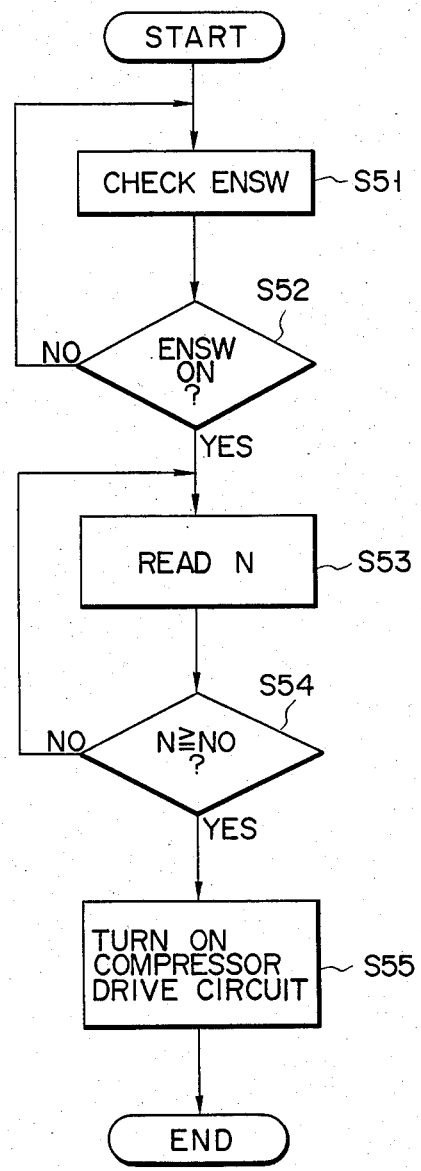
FIG. 7 is a flow chart showing a sixth example of control.

Now, a sixth example will be described with reference to FIG. 7. The flow chart of FIG. 7 illustrates a routine of the controller 36 in this example.

First, an engine switch position check is done in a step S51. In a subsequent step S52, a check is done as to whether the engine switch is "on". If the decision of the check in the step S52 is "YES", a step S53 is executed. If the decision is "NO", the routine goes back to the step S51 of checking the engine switch position. In the step S53, engine revolving rate data N provided from the engine revolving rate sensor (RVSW) 50 is read out into the controller 36. Then, a step S54 is executed, in which a check is done as to whether the engine revolving rate is a preset level. The preset level substantially corresponds to a revolving rate that is obtained when the engine idling is stabilized after the start of the engine. If the decision of the check in the step S54 is "NO", it is concluded that the engine operation has not yet been stabilized although the engine switch has been turned on, and the routine goes back to the step S53 of checking the engine switch position. If the decision of the check in the step S54 is "YES", a step S56 is executed, in which the compressor drive circuit is turned on to permit driving of the compressor 19 for supplying compressed air to the reservoir tank 21.

It is to be noted that after the engine has been started with the ignition key turned on, the driving of the compressor 19 is inhibited until the engine revolving rate exceeds a preset level.

Thus, with the sixth example it is possible to solve the problems in the engine lubrication and idling and overcome the defficiencies in the engine starting property when the compressor 19 is driven.

Figure 8:
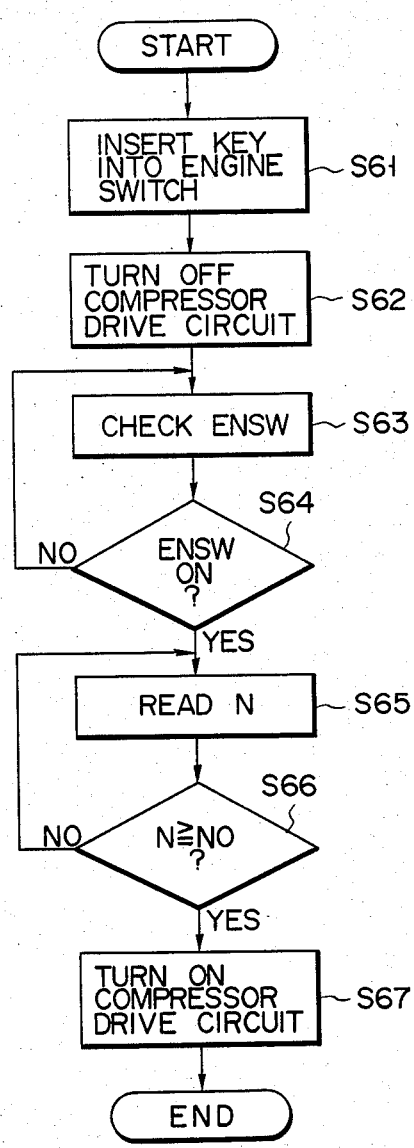
FIG. 8 is a flow chart showing a seventh example of control.

Now, a seventh example of the control according to the invention will be described with reference to FIG. 8. The flow chart of FIG. 8 illustrates a routine of the controller 36 in this example.

First, it is detected in a step S61 that a key is inserted into the engine switch by the driver. The routine then proceeds to a step S62, in which the compressor drive circuit is turned off through control by the controller 36. In consequence, the driving of the compressor 19 is inhibited. In a subsequent step S63, the engine switch position is checked. In a subsequent step S64, a check is done as to whether the engine switch is "on". If the decision of the check in the step S64 is "YES", a step S65 is executed. If the decision is "NO", the routine goes back to the step S63 of checking the engine switch position. In the step S65, engine revolving rate data N from the engine revolving rate sensor (RVSW) 50 is read into the controller 36. In a subsequent step S66, a check is done as to whether the engine revolving rate N is above a preset level. The preset level is set in the same way as in the preceding sixth example. If the decision of the check in the step S66 is "YES", a step S67 is executed, in which the compressor drive circuit is turned on to permit driving of the compressor 19 for supplying compressed air to the reservoir tank 21.

It is to be noted that the compressor drive circuit is reliably turned off when the key switch is inserted into the engine switch, and the driving of the compressor 19 constituting a high load is inhibited until the engine revolving rate exceeds the preset level. Thus, with the seventh example the same effects as in the preceding sixth example can be obtained.

Figure 9:
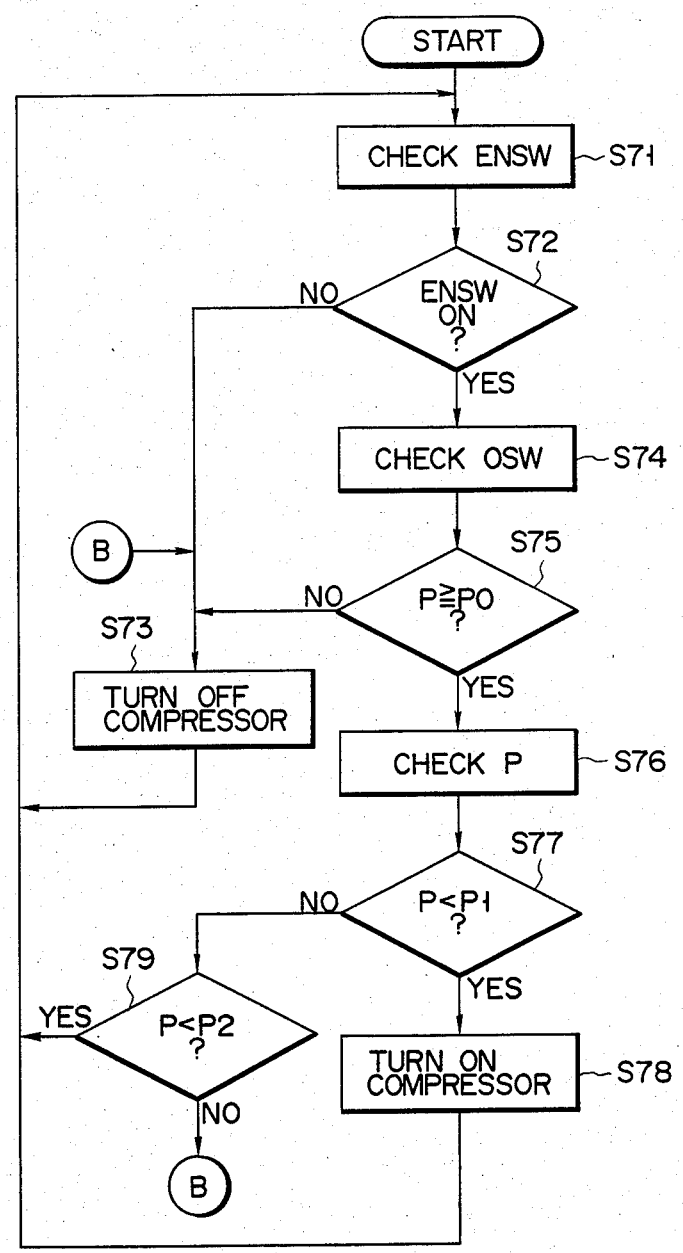
FIG. 9 is a flow chart showing an eighth example of control.

An eighth example will now be described with reference to FIG. 9. The flow chart of FIG. 9 illustrates a routine of the controller 36 in this example. First, the state of the engine switch 51 is read out into the controller 36 in a step S71. In a subsequent step S72, a check is done as to whether the engine switch 51 is "on". If the decision of the check in this step S72 is "NO", it is concluded that the engine has not yet been started so that it is inappropriate to start the compressor 19, and a step S73 is executed, in which it is confirmed that the compressor 19 is stopped. The routine then goes back to the step S71 of checking the engine switch position. If it is found in the step S73 that the compressor 19 is being driven, it is stopped. If the decision of the check in the step S72 is "YES", a step S74 is executed, in which the value detected by the oil pressure sensor 47 is read into the controller 36. In a subsequent step S75, a check is done as to whether the value P detected by the oil pressure sensor 47 is above a preset level Po. The preset level corresponds substantially to an oil pressure that is obtained when the engine idling has been stabilized after the start of the engine. If the decision of the check in the step S75 is "NO", it is concluded that the engine has not yet been started although the engine switch 51 has been turned on or the engine operation has not yet been stabilized although the engine has been started, so that the routine goes back through the step S73 to the step S71. If the decision of the check in the step S75 is "YES", the routine proceeds to a step S76, in which the detection signal P of the pressure sensor 35 is read into the controller 36. In a subsequent step S77, a check is done as to whether the inner pressure in the reservoir tank 21 is lower than a first preset level P1 (e.g., 7 kg/cm$^2$). If the decision of the check in the step S77 is "YES", it is concluded that it is necessary to replenish the reservoir tank 21 with compressed air, so that a step S78 is executed, in which a signal is supplied to the compressor drive relay 191 to drive the compressor 19. The routine then goes back to the step S71 of checking the engine switch position. If the compressor 19 is being driven, it is confirmed in the step S78. If the decision of the check in the step S77 is "NO", a step S79 is executed, in which a check is done as to whether the inner pressure in the reservoir tank 21 is less than a second preset level P2 (e.g., 9.5 kg/cm$^2$) which is higher than the first preset level. If the decision of the check in the step S79 is "NO", it is concluded that the inner pressure in the reservoir tank 21 is sufficient, and the routine goes back to the step S73 of supplying a signal to the compressor drive relay 191 to stop the compressor 19. If the decision of the check in the step S79 is "YES", the routine goes back to the step S71 of checking the engine switch position.

As has been shown, in the eighth example shown in FIG. 9 the driving of the compressor 19 is reliably inhibited when the engine lubrication oil pressure is below a preset level and is enabled when and only when the engine operation has been stabilized with increase of the engine lubrication oil pressure to a sufficient level. Thus, it is possible to solve the problems in the engine lubrication and idling and overcome defficiencies in the engine starting property when the compressor 19 is driven.

Figure 10:
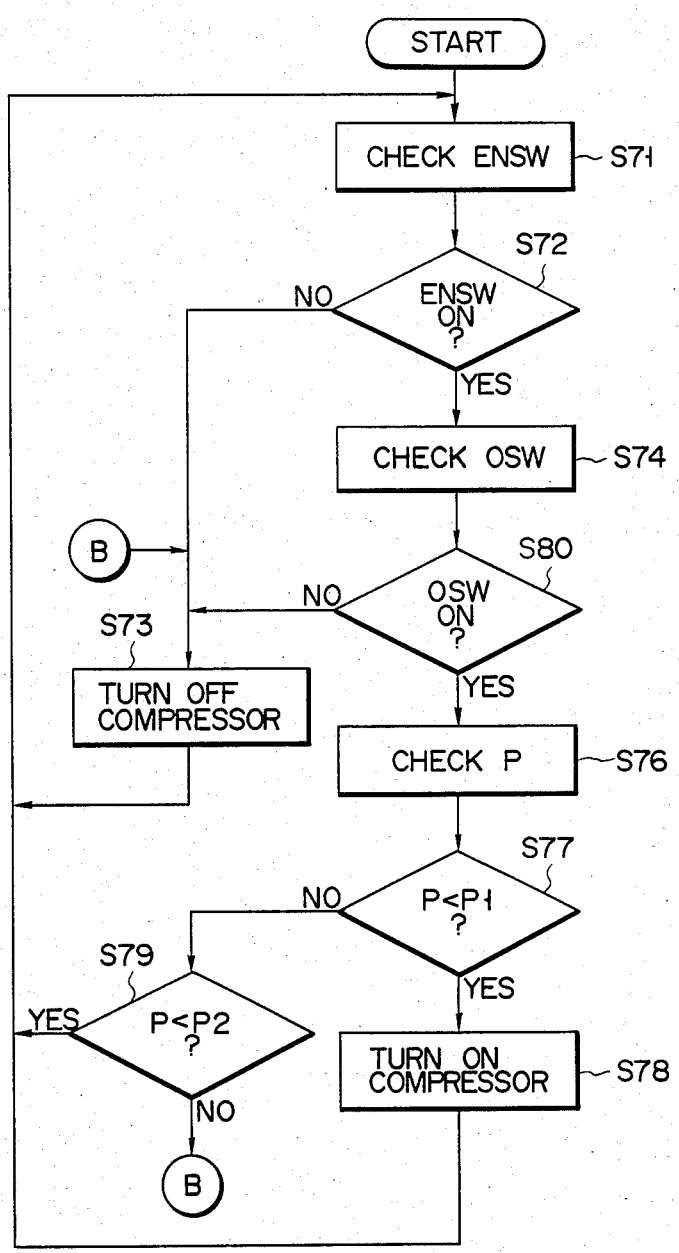
FIG. 10 is a flow chart showing a nineth example of control.

Now, a nineth example will be described with reference to FIG. 10.

In this example, a pressure switch which provided a signal when and only when the oil pressure exceeds a preset level is used as the oil pressure sensor (OSW) 47. The preset level, like the case of the preceding eighth example, substantially corresponds to an oil pressure obtained only when the engine operation has been stabilized after the start of the engine. In this nineth example, a step S80 is provided in lieu of the step S75 between the steps S74 and S75 in the eighth example. In the step S80, a check is done as to whether the pressure sensor consisting of the pressure switch is providing a signal. If the decision of the check is "YES", the routine goes to step S76. If the decision is "NO", the routine goes to step S73.

Thus, with the nineth example the same effects as in the eighth example can be obtained.

Figure 11:
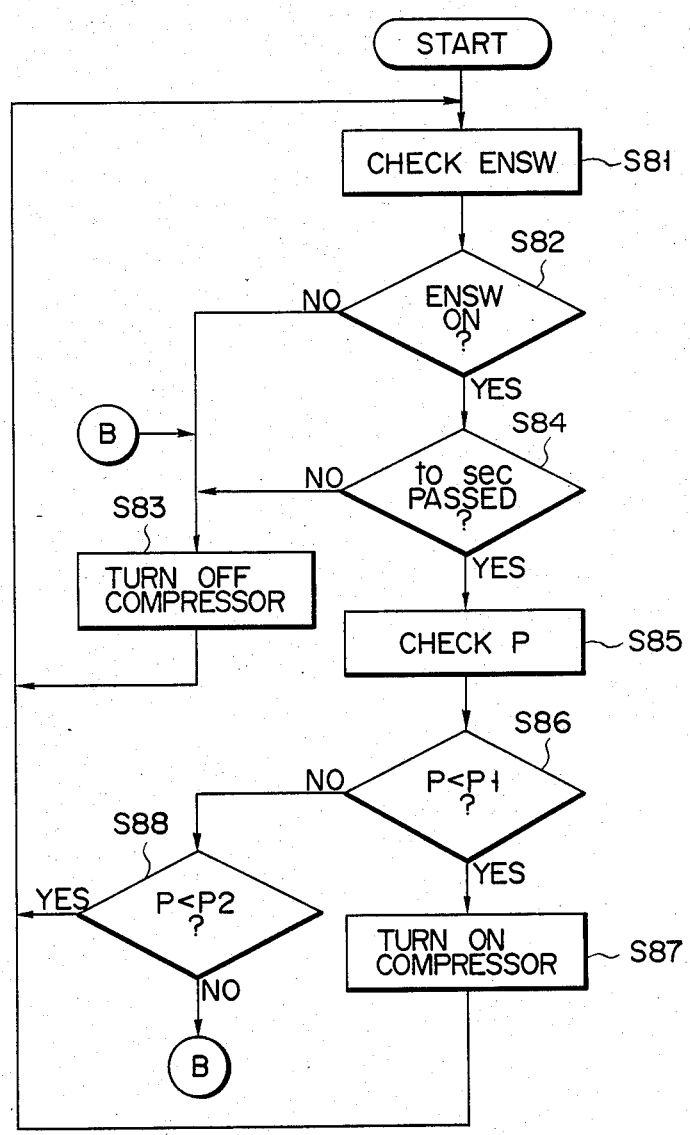
FIG. 11 is a flow chart showing a tenth example of control.

Now, a tenth example will be described with reference to FIG. 11. The flow chart of FIG. 11 illustrates a routine of the controller 36 in this example. First, the state of the engine switch 51 is read out into the controller 36 in a step S81. In a subsequent step S82, a check is done as to whether the engine switch 51 is "on". If the decision of the check in the step S82 is "NO", it is concluded that the engine has not yet been started so that it is inappropriate to start the compressor 19, and a step S83 is executed, in which it is confirmed that the compressor 19 is stopped. The routine then goes back to the step S81 of checking the engine switch position. If it is found in the step S83 that the compressor 19 is being driven, it is stopped. If the decision of the check in the step S82 is "YES", a step S84 is executed, in which a check is done as to whether a preset time of $t_0$ sec has passed after the closure of the engine switch. The preset time of $t_0$ sec corresponds to a sufficient period of time for the start of the engine and the stabilization of the engine idling after the closure of the engine switch 51. If the decision of the check in the step S84 is "NO", it is concluded that the engine has not yet been started although the engine switch 51 has been closed or the engine operation has not yet been stabilized although the engine has been started, and the routine goes back through the step S83 to the step S81 of checking the engine switch position. If the decision of the check in the step S84 is "YES", a step S85 is executed, in which the detection signal of the pressure sensor 35 representing the inner pressure of the reservoir tank 21 is read out into the controller 36. In a subsequent step S86, a check is done as to whether the inner pressure in the reservoir tank 21 is lower than a first preset level P1 (e.g., 7 kg/cm$^2$). If the decision of the check in this step S86 is "YES", it is concluded that it is necessary to replenish the reservoir tank 21 with compressed air, so that a step S87 is executed, in which a signal is supplied to the compressor drive relay 191 to drive the compressor 19. The routine then goes back to the step S81 to check the engine switch position. If the compressor 19 is being driven, it is confirmed in the step S87. If the decision of the check in the step S86 is "NO", a step S88 is executed, in which a check is done as to whether the inner pressure in the reservoir 21 is lower than a second preset level P2 (e.g., 9.5 kg/cm$^2$) which is higher than the first preset level. If the decision of the check in this step S88 is "NO", it is concluded that the inner pressure in the reservoir tank 21 is sufficient, so that the step S83 is executed to supply a signal to the compressor drive relay 191 for stopping the compressor 19. If the decision of the check in the step S88 is "YES", so that the routine goes back to the step S81 of checking the engine switch position.

It is to be noted that in the tenth example shown in FIG. 11 the driving of the compressor 19 is reliably inhibited while the preset time has not passet yet after the closure of the engine switch 51, and is enabled when and only when the engine operation has stabilized with increase of the engine lubrication oil pressure to a sufficient level after the start of the engine. Thus, it is possible to solve the problems in the engine lubrication and idling and overcome defficiencies starting property when the compressor 19 is driven.

Now, an eleventh example will be described with reference to FIG. 12.

Figure 12:
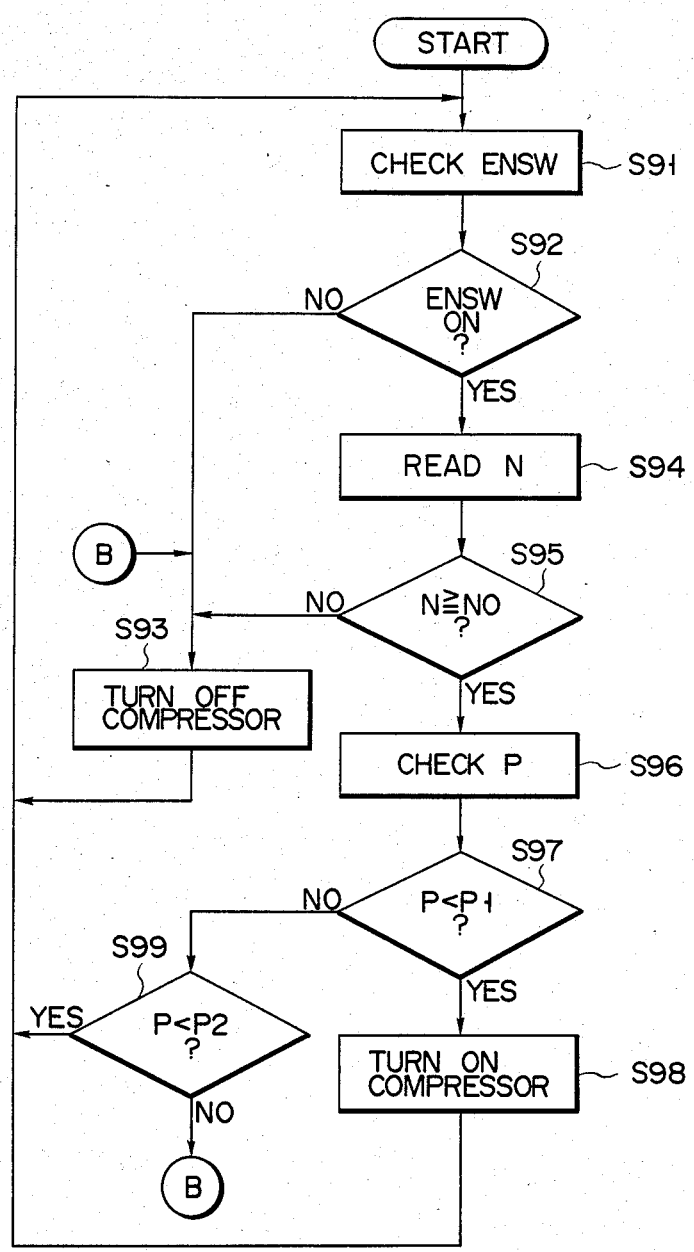
FIG. 12 is a flow chart showing an eleventh example of control.

The flow chart of FIG. 12 illustrates a routine of the controller 36 in this example. First, the state of the engine switch 51 is read out into the controller 36 in a step S91. In a subsequent step S92, a check is done as to whether the engine switch 51 is "on". If the decision of the check in the step S92 is "NO", it is concluded that the engine has not yet been started so that it is inappropriate to start the compressor 19, and a step S93 is executed, in which it is conformed that the compressor 19 is stopped. The routine then goes back to the step S91 of checking the engine switch position. If the compressor 19 is being driven, it is stopped in the step S93. If the decision of the check in the step S92 is "YES", a step S94 is executed, in which revolving rate data N detected by the revolving rate sensor 50 is read out into the controller 36. In a subsequent step S95, a check is done as to whether the value N detected by the revolving rate sensor 50 is above a preset level. The preset level substantially corresponds to a revolving rate obtained when the engine idling has stabilized after the engine start (e.g., 700 rpm). If the decision of the check in the step S95 is "NO", it is concluded that that the engine has not yet been started although the engine switch 51 has been turned on or the engine operation has not yet been stabilized although the the engine has been started. The routine then goes back through the step S93 to the step S91 of checking the engine switch position. If the decision of the check in the step S95 is "YES", a step S96 is executed, in which the detection signal of the pressure sensor 35 representing the inner pressure of the reservoir tank 21 is read out into the controller 36. In a subsequent step S97, a check is done as to whether the inner pressure in the reservoir tank 21 is lower than a first preset level P1 (e.g., 7 kg/cm$^2$). If the decision of the check in the step S97 is "YES", it is concluded that it is necessary to replenish the reservoir 21 with compressed air, and a step S98 is executed, in which a signal is supplied to the compressor drive relay 191 for driving the compressor 191. The routine then goes back to the step S91 of checking the engine switch position. If the compressor 19 is being driven, it is confirmed in the step S98. If the decision of the check in the step S97 is "NO", a step S99 is executed, in which a check is done as to whether the inner pressure in the reservoir 21 is lower than a second preset level P2 (e.g., 9.5 kg/cm$^2$) which is higher than the first preset level. If the decision of the check in the step S99 is "NO", it is concluded that the pressure in the reservoir tank 21 is sufficient, and the routine goes back to the step S93 of supplying a signal to the compressor drive relay 191 to stop the compressor 19. If the decision of the check in the step S99 is "YES", the routine goes back to the step S91 of checking the engine switch position.

It is to be noted that in the eleventh example shown in FIG. 12 the driving of the compressor 19 is reliably inhibited while the engine revolving rate is below a preset value and is enabled when and only when the engine operation has been stabilized with increase of the engine lubrication oil pressure to a sufficient level. Thus, it is possible to solve the problems in the lubrication and idling and overcome defficiencies in the starting property when the compressor 19 is driven.

The first to seventh examples are readily applicable to a suspension apparatus of a type, in which the reservoir tank 21 is omitted and compressed air is supplied directly from the compressor 19 to the individual suspension units.

Further, in the routines of the eighth to eleventh examples, if the compressor drive circuit is turned off as initialization immediately after the start or it has already been "off", a step of confirming this may be additionally provided, if necessary.

What is claimed is:

1. A vehicle suspension apparatus comprising:
   suspension units each provided for each wheel and each having an air spring chamber;
   a reservoir tank for storing compressed air to be supplied through an air supply valve to said air spring chambers of said suspension units;
   exhausting means for exhausting compressed air from said air spring chambers of said suspension units through an exhaust control valve;
   a compressor driven by at least one of a vehicle running engine and an electrical power supply of the engine for supplying compressed air to said reservoir tank;
   engine condition detecting means for detecting the rotation condition of the engine on the basis of the rotational speed of the engine after an engine switch for starting the engine has been turned on and for generating a signal when the rotation of the engine is stabilized; and
   control means coupled to said engine condition detecting means for inhibiting the driving of said compressor until said engine condition detecting means detects that the rotation of the engine has been stabilized after the start of the engine.

2. The vehicle suspension apparatus according to claim 1, wherein said compressor is driven by a battery for supplying power to an electric system of said engine.

3. The vehicle suspension apparatus according to claim 1, wherein said engine condition detecting means further comprises an oil pressure sensor for detecting the pressure of the engine lubrication oil.

4. The vehicle suspension apparatus according to claim 3, wherein said control means inhibits the driving of said compressor while the engine lubrication oil pressure detected by said oil pressure sensor is lower than a preset level.

5. The vehicle suspension apparatus according to claim 1, wherein said engine condition detecting means comprises an engine revolving rate sensor for detecting the engine revolving rate.

6. The vehicle suspension apparatus according to claim 5, wherein said control means inhibits the driving of said compressor while the engine revolving rate detected by said engine revolving rate sensor is lower than a preset level.

7. The vehicle suspension apparatus according to claim 1, wherein said control means includes a microcomputer.

8. A vehicle suspension apparatus comprising:
   suspension units each provided for each wheel and each having an air spring chamber;
   a compressor driven by at least one of a vehicle running engine and an electrical power supply of the engine for supplying compressed air to said air spring chamber of said suspension units through an air supply control valve;
   exhausting means for exhausting compressed air from said air spring chambers of said suspension units through an exhaust control valve;
   engine condition detecting means for detecting the rotation condition of the engine on the basis of the rotational speed of the engine after an engine switch for starting the engine has been turned on and for generating a signal when the rotation of the engine is stabilized; and
   control means coupled to said engine condition detecting means for inhibiting the driving of said compressor until said engine condition detecting means detects that the rotation of the engine has been stabilized after the start of the engine.

9. A vehicle suspension apparatus comprising:
   suspension units each provided for each wheel and each having an air spring chamber;
   a reservoir tank for storing compressed air to be supplied through an air supply valve to said air spring chamber of said suspension units;
   exhausting means for exhausting compressed air from said air spring chambers of said suspension units through an exhaust control valve;
   reservoir tank pressure detecting means for detecting the pressure in said reservoir tank; and
   compressor control means for driving said compressor when said reservoir tank pressure detecting means detects that the pressure in said reservoir tank is lower than a present level,
   said vehicle suspension apparatus further comprising:
   engine condition detecting means for detecting the rotation condition of the engine on the basis of the rotational speed of the engine after an engine switch for starting the engine has been turned on and for generating a signal when the rotation of the engine is stabilized; and
   control means coupled to said engine condition detecting means for inhibiting the driving of said compressor until said engine condition detecting means detects that the rotation of the engine has been stablized after the start of the engine.

10. The vehicle suspension apparatus according to claim 9, wherein said control means includes a microcomputer.

11. The vehicle suspension apparatus according to claim 9, wherein said compressor is driven by a battery for supplying power to an electric system of said engine.

12. The vehicle suspension apparatus according to claim 9, wherein said engine condition detecting means further comprises an oil pressure sensor for detecting the pressure of the engine lubrication oil.

13. The vehicle suspension apparatus according to claim 12, wherein said control means inhibits the driving of said compressor while the engine lubrication oil pressure detected by said oil pressure sensor is lower than a preset level.

14. The vehicle suspension apparatus according to claim 9, wherein said engine condition detecting means an engine revolving rate sensor for detecting the engine revolving rate.

15. The vehicle suspension apparatus according to claim 14, wherein said control means inhibits the driving of said compressor while the engine revolving rate detected by said revolving rate sensor is lower than a preset level.

* * * * *